(12) United States Patent
Houston et al.

(10) Patent No.: US 11,787,242 B2
(45) Date of Patent: Oct. 17, 2023

(54) SYSTEM AND METHOD FOR COMPENSATING TRANSMISSION DELAYS IN TIRE PRESSURE MONITORING SYSTEM

(71) Applicant: Sensata Technologies, Inc., Attleboro, MA (US)

(72) Inventors: Samuel D. Houston, Antrim (GB); Jonathan Edward Barr, Londonderry (GB); Nevin R. Molyneaux, Crumlin (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 5 days.

(21) Appl. No.: 17/584,960

(22) Filed: Jan. 26, 2022

(65) Prior Publication Data

US 2022/0242175 A1 Aug. 4, 2022

Related U.S. Application Data

(60) Provisional application No. 63/143,075, filed on Jan. 29, 2021.

(51) Int. Cl.
*B60C 23/04* (2006.01)
*H04W 4/48* (2018.01)
*H04Q 9/00* (2006.01)

(52) U.S. Cl.
CPC ........... *B60C 23/0457* (2013.01); *H04Q 9/00* (2013.01); *H04Q 2209/43* (2013.01)

(58) Field of Classification Search
None
See application file for complete search history.

(56) References Cited

U.S. PATENT DOCUMENTS 7,010,968 B2 * 3/2006 Stewart ............... B60C 23/0416
73/146
10,317,234 B2 * 6/2019 Kang ................. G01C 21/3697
(Continued)

FOREIGN PATENT DOCUMENTS

EP 2759418 A1 * 7/2014 ......... B60C 23/0408
EP 2759418 A1 7/2014
(Continued)

OTHER PUBLICATIONS

When tire pressure monitoring gets smart Aug. 15, 2018 by Lee Teschler (Year: 2018).*
(Continued)

*Primary Examiner* — Curtis A Kuntz
*Assistant Examiner* — Jerold B Murphy
(74) *Attorney, Agent, or Firm* — Mark H. Whittenberger; Holland & Knight LLP

(57) ABSTRACT

Embodiments included herein are directed towards systems and methods for tire pressure monitoring. Embodiments may include transmitting a first Bluetooth Low Energy ("BLE") event at a Phase Auto-Location ("PAL") block associated with a vehicle electronic control unit ("ECU"). Embodiments may further include generating a random number to be used for an inter-event delay associated with a BLE system, wherein the inter-event delay includes a fixed time and a randomized delay. Embodiments may also include calculating a time for the randomized delay and adding the time to an encoded Look Back Time ("LBT") from the first BLE event to generate frame contents. Embodiments may further include providing the frame contents and the random number to a stack for transmission.

17 Claims, 11 Drawing Sheets

(56) References Cited

U.S. PATENT DOCUMENTS

| | | | | |
|---|---|---|---|---|
| 2011/0313623 | A1* | 12/2011 | Greer | B60C 23/0437 |
| | | | | 701/49 |
| 2013/0257610 | A1* | 10/2013 | Lee | B60C 23/0455 |
| | | | | 340/442 |
| 2018/0134102 | A1* | 5/2018 | Okada | G01P 15/00 |
| 2018/0244116 | A1* | 8/2018 | Zhuk | B60C 23/0416 |
| 2019/0230615 | A1* | 7/2019 | Werner | B60C 23/0408 |
| 2020/0300885 | A1* | 9/2020 | Fujii | B60C 19/00 |
| 2020/0369100 | A1* | 11/2020 | Pierre | B60C 23/0416 |
| 2021/0181981 | A1* | 6/2021 | Zhu | G06F 3/0679 |

FOREIGN PATENT DOCUMENTS

| | | |
|---|---|---|
| FR | 3078288 | 6/2020 |
| KR | 101439482 B1 * | 11/2014 |

OTHER PUBLICATIONS

A Deep Dive into BLE Packets and Events Mohammad Afaneh Mar. 30, 2020 (Year: 2020).*
Innovation to Come by Sean Phillips Jan. 1, 2015 (Year: 2015).*
KR-101439482-B1 English Language Translation. (Year: 2014).*
BLE connection intervals and events in under 5 minutes Mohammad Afaneh May 28, 2016 (Year: 2016).*
BLE Advertising packet format | BLE Data packet format (Year: 2012).*
Frames specifications—BLE, ELA Innovation (Year: 2020).*

* cited by examiner

SYSTEM AND METHOD FOR COMPENSATING TRANSMISSION DELAYS IN TIRE PRESSURE MONITORING SYSTEM

CROSS REFERENCE TO RELATED APPLICATIONS

The subject application claims the benefit of U.S. Provisional application having Ser. No. 63/143,075, filed 29 Jan. 2021. The entire content of which is herein incorporated by reference.

BACKGROUND

In tire pressure monitoring systems, performing auto-location of a wheel is needed for a number of reasons. Tire pressure monitoring systems generally include a sensor in or at each wheel of a vehicle and a central controller which receives tire pressure information from each sensor, to be reported to the driver of the vehicle. Auto-location is the identification of each sensor and determination of its position on the vehicle, automatically and without human intervention. Auto-location may be done initially upon installation and subsequently in the event of tire rotation or replacement. Performing auto-location involves determining the identity or serial number of a tire pressure monitoring (TPM) sensor in each of the wheels in the car. In premium vehicles, knowing the identity of the TPM sensor in each wheel allows a pressure by position display to be implemented and shown to the driver. In base vehicles with different placard tire pressures for front and rear axles, it is desirable to know TPM sensor identities and positions in order to check pressure against a correct threshold for an applicable axle.

In most countries, it is mandatory for passenger car vehicles to have a tire pressure monitoring system to alert the driver of under inflated tires. The purpose of this is to inform the driver of an unsafe operating mode relating to one, or all of the tires on the vehicle.

Each sensor that is installed in the wheels has a unique identification code associated with it, which enables the pressure values for each wheel to be displayed on the dashboard. If the identification code for each sensor can be associated with a corner of the vehicle, then the vehicle original equipment manufacturer ("OEM") can implement a 'pressure by position' display.

SUMMARY OF THE DISCLOSURE

As will be discussed in greater detail below, embodiments included herein are directed towards systems and methods for tire pressure monitoring. In one implementation, a method may include transmitting a first Bluetooth Low Energy ("BLE") event at a Phase Auto-Location ("PAL") block associated with a vehicle electronic control unit ("ECU"). The method may further include generating a random number to be used for an inter event delay associated with a BLE system, wherein the inter event delay includes a fixed time and a randomized delay. The method may also include calculating a time for the randomized delay and adding the time to an encoded Look Back Time ("LBT") from the first BLE event to generate frame contents. The method may further include providing the frame contents and the random number to a stack for transmission.

One or more of the following features may be included. The method may include transmitting at least one of the frame contents and the random number. Generating may occur after advertising has been requested. The first BLE event may be a single event that is received prior to transmitting. Generating a random number may include selecting a seed from a look-up-table. Calculating a time may include selecting a time from a look-up-table.

In another implementation, a tire pressure monitoring system is provided. The system may include an electronic control unit ("ECU") configured to transmit or receive a first Bluetooth Low Energy ("BLE") event at a Phase Auto-Location ("PAL") block associated with the ECU. The system may further include a processor configured to generate a random number to be used for an inter event delay associated with a BLE system, wherein the inter event delay includes a fixed time and a randomized delay. The processor may be further configured to calculate a time for the randomized delay and to add, using a processor, the time to an encoded Look Back Time ("LBT") from the first BLE event to generate frame contents. The processor may be further configured to provide the frame contents and the random number to a stack for transmission.

One or more of the following features may be included. The at least one processor may be further configured to transmit at least one of the frame contents and the random number. Generating may occur after advertising has been requested. The first BLE event may be a single event that is received prior to transmitting. Generating a random number may include selecting a seed from a look-up-table. Calculating a time may include selecting a time from a look-up-table.

In yet another implementation, a tire pressure monitoring method is provided. The method may include transmitting from a wheel sensor, a first frame associated with a first Bluetooth Low Energy event ("BLE") and adding a first inter-frame delay to a Look Back Time ("LBT") associated with the first BLE. The method may further include transmitting, from the wheel sensor, a second frame associated with a second BLE event and adding a second inter-frame delay to an LBT associated with the second BLE event. The method may also include transmitting, from the wheel sensor, a third frame associated with a third BLE event.

One or more of the following features may be included. The wheel sensor may include a BLE stack configured to allow modification of frame contents. The method may also include transmitting data to the ECU without requiring inter-frame delay compensation by a vehicle ECU. The method may further include transmitting data to the ECU without requiring that a vehicle ECU determine a received channel. The method may also include transmitting data to the ECU without requiring that a vehicle ECU store an inter-event delay. The method may further include receiving a scan request from the vehicle ECU. The method may also include transmitting a scan response to the vehicle ECU. The scan response may occur without modifying frame contents.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

The present invention is directed to systems and methods in which a measurement from a wheel is combined with antilock brake system (ABS) data to allow identification of the tire pressure monitoring sensors to a specific location on a vehicle as well as to compensate for transmission delays in a TPM system. In accordance with various embodiments of the present invention, a tire pressure monitoring system comprises wheel rim or tire mounted TPM sensors, typically four, and an Electronic Control unit (ECU) that receives signals from the TPM sensors. In addition, the system employs data presented to the ECU from the Anti-lock Brake System (ABS).

Figure 1:
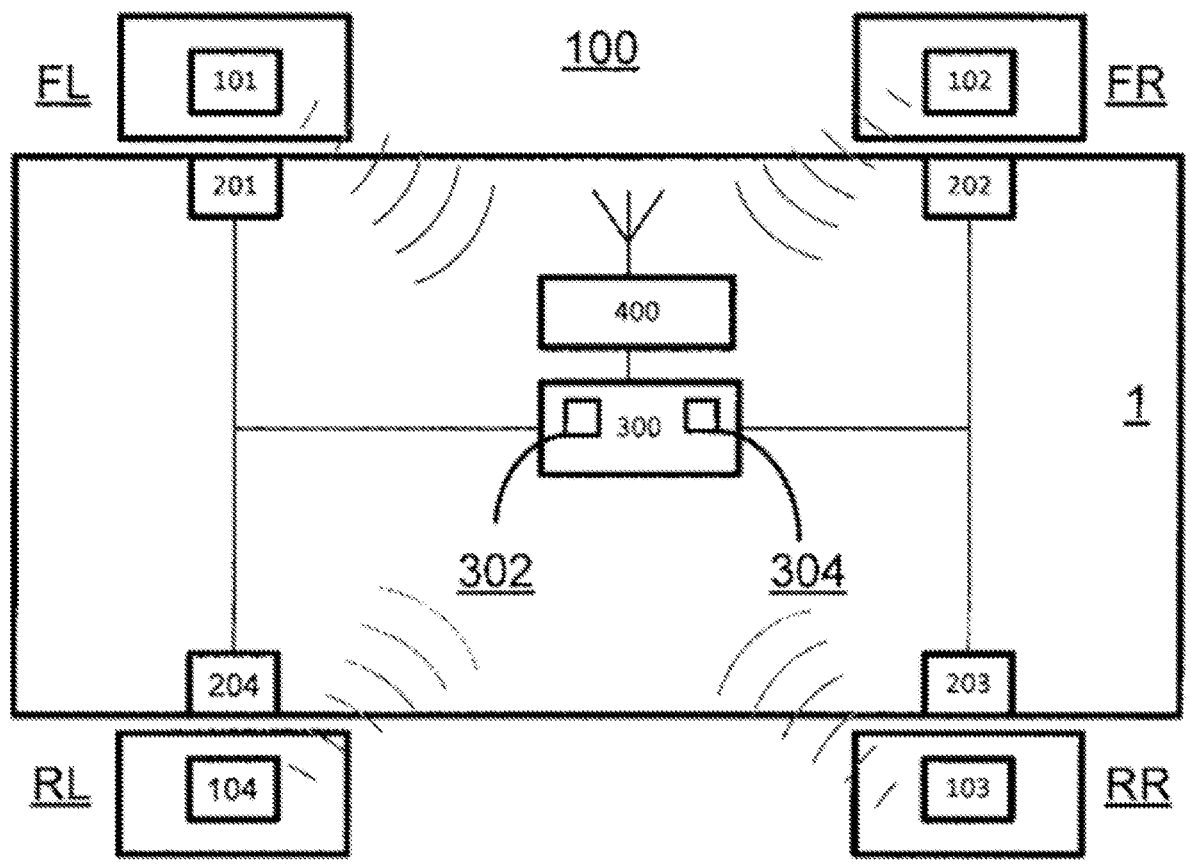
FIG. 1 illustrates one embodiment of a tire pressure monitoring system.

FIG. 1 illustrates a tire pressure monitoring system 100 according to a first embodiment of the present disclosure. The system 100 may be arranged in a standard vehicle 1 having four wheels. Four wheels include a front left wheel (FL), a front right wheel (FR), a rear left wheel (RL) and a rear right wheel (RR). In another embodiment, the system 100 may be arranged in any other vehicle having a different number of wheels. The system 100 may include wheel units 101, 102, 103 and 104 that may be associated with each wheel of the vehicle 1.

In some embodiments, system 100 may further include four antilock brake system (ABS) sensors 201, 202, 203 and 204. ABS sensors 201-204 may also be associated with each wheel of the vehicle 1. Accordingly, each wheel may be assigned with one of the wheel units 101, 102, 103 and 104 and one of ABS sensors 201, 202, 203 and 204.

In some embodiments, system 100 may also include an Electronic Control Unit (ECU) 300 and a receiver 400. The ECU 300 may be coupled to the ABS sensors 201-204 via a communication bus such as a Controller Area Network (CAN) bus and may receive ABS data from the ABS sensors 201-204. The ECU 300 may include processor 302 and storage 304. The ECU 300 operates to store received ABS data in the storage 304 to provide a historic ABS trace. The ECU 300 may be implemented by any suitable means, for example a microprocessor, microcontroller, an Application Specific Integrated Circuit (ASIC), or other suitable data processing device programmed to perform the functions described herein. Further, the ECU 300 may communicate with other vehicle components using any other suitable device, either wire line or wireless. The CAN bus is an exemplary implementation of data communication among components of the vehicle.

In some embodiments, ECU 300 may also receive data from the wheel units 101, 102, 103 and 104 via the receiver 400. For example, the wheel units 101, 102, 103 and 104 transmit radio frequency or other wireless communications conveying data and other information to the ECU 300. The respective wheel units may include a suitable radio transmission circuit and the ECU 300 includes a suitable radio reception circuit for radio communication. Further, the radio circuits may use an agreed upon transmission and reception format and data encoding technique. The ECU 300 operates to correlate the data received from the wheel units 101, 102, 103 and 104 with the ABS data in order to perform auto-location, as will be discussed in detail below.

Figure 2:
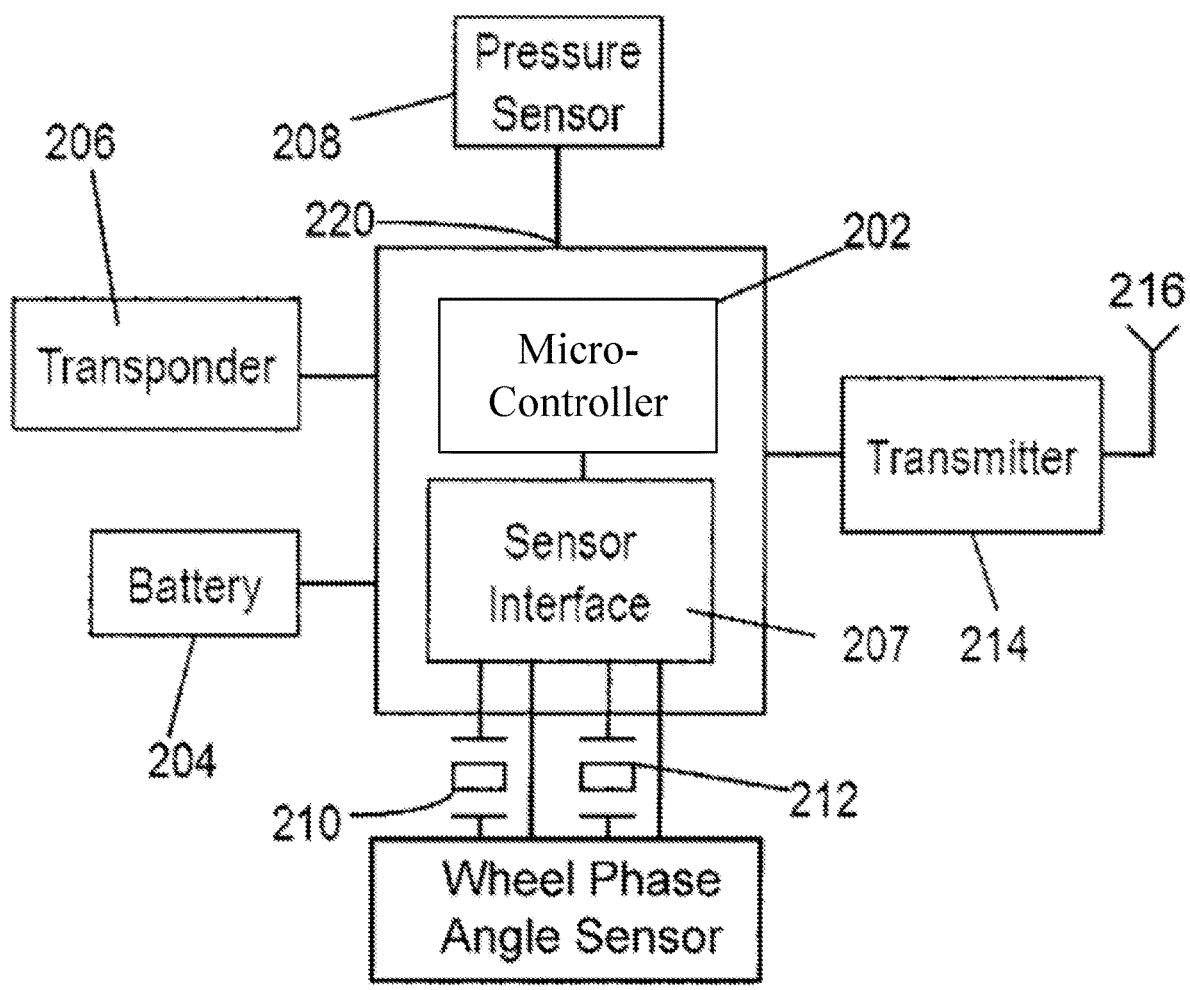
FIG. 2 illustrates one embodiment of a wheel unit for use with the tire pressure monitoring system.

Referring to FIG. 2, the structure of the wheel unit 101 is illustrated in more detail. The wheel units 102-104 may incorporate the same structure as that of the wheel unit 101. As shown in FIG. 2, the wheel unit 101 includes a microcontroller 202, a battery 204, a transponder coil 206, a sensor interface 207, a pressure sensor 208, a wheel phase angle sensor 212, a transmitter 214 and an antenna 216. The microcontroller 202 is coupled to the sensor interface 207. The sensor interface 207 is coupled to the wheel phase angle sensor 212. The wheel phase angle sensor 212 measures a wheel phase angle at multiple different times. The wheel phase angle sensor 212 provides measurements to the sensor interface 207. The sensor interface 207 may receive the measurements of the wheel phase angle sensor 212 in the form of an electrical output signal. The sensor interface 207 may receive the electrical output signal and amplifies and filters the signal. The sensor interface 207 may send the processed signal to an analog to digital converter (not shown) in order to convert the signal into a digital signal. The microcontroller 202 may receive the digital form of the output signal from the wheel phase angle sensor 212 for processing.

In the illustrated embodiment, the pressure sensor 208 may detect the pneumatic air pressure of the tire with which the wheel unit 101 is associated. In alternative embodiments, the pressure sensor 208 may be supplemented with or replaced by a temperature sensor or other devices for detecting tire data. An indication of the tire pressure data is sent to the microcontroller 202 via the analog-to-digital converter (not shown).

In some embodiments, battery 204 may be a power source of the wheel unit 101. The transponder coil 206 may detect external activation of the transponder by a signal applied by a remote exciter and may modulate a signal to communicate data to a remote detector from the wheel unit 101. The wheel unit 101 may provide data including tire pressure from the pressure sensor 208 and the wheel phase angle information from the wheel phase angle sensor 212 through the transmitter 214 and the antenna 216 to the ECU 300 (see FIG. 1).

In operation, upon rotation of a wheel, wheel phase angle sensor 212 may operate to measure a wheel phase angle. The wheel phase angle measurements may not have to be against an absolute reference. In other words, the phase measurements do not have to be measured from a top of wheel, or road striking point. The key piece of information may be a phase difference, or a phase delta of the wheel, and therefore, the requirement is that two different phase angles are measured relative to the same angle. The reference may be arbitrarily selected based on accuracy capability and ease of implementation. The wheel phase angle sensor 212 may be mounted on a rim of the wheel, or a tire mounted sensor. Alternatively, or additionally, the wheel phase angle sensor 212 may be arranged on any suitable location associated with a wheel. In one embodiment, the wheel phase angle 212 includes a rotation sensor. For example, the rotation sensor may be a piezoelectric rotation sensor which measures a wheel phase angle based on the gravitational force. Specifically, as the wheel rotates, the gravitational force causes a sensing element of the rotation sensor to experience different forces which results in a different output signal representing a wheel phase angle or wheel angular position. In that way, the rotation sensor produces an output signal indicating a wheel phase angle at a predetermined time. The output signal of the rotation sensor may have different amplitude and/or different polarity depending on the wheel phase angle. For instance, the rotation sensor produces the output signal having amplitude M at 0 degree and having the amplitude −M at 180 degree. Alternatively, or additionally, any conventional rotation sensor may be used as the wheel phase angle sensor 212.

In another embodiment, the wheel phase angle sensor 212 comprises a shock sensor of the type that produces an electrical signal in response to acceleration. The electrical signal is indicative of, or typically proportional to, the experienced change in acceleration. Alternatively, the wheel phase angle sensor 212 may each comprise an accelerometer or a micro-electromechanical systems (MEMS) sensor. The main difference between an accelerometer and a shock sensor is that the output signal from a shock sensor is related to a change of force applied to the shock sensor, whereas the output signal from an accelerometer is proportional to the absolute force applied. Shock sensors may be implemented, for example, with shock sensors discussed in commonly owned U.S. Pat. No. 7,362,218, issued Apr. 22, 2008 and entitled Motion Detection Using A Shock Sensor In A Remote Tire Pressure Monitor System and commonly owned U.S. Pat. No. 7,367,227, issued May 6, 2008 and entitled Determination Of Wheel Sensor Position Using Shock Sensors And A Wireless Solution, the disclosures of which are incorporated here in its entirety. Accelerometer sensors may be implemented, for example, with sensors discussed in commonly owned U.S. Pat. No. 7,010,968, issued Mar. 14, 2006 and entitled Determination Of Wheel Sensor Position Using A Wireless Solution, the disclosure of which is incorporated herein its entirety.

Referring also to FIGS. 3-10, embodiments of the present disclosure may provide a system and method for compensation of phase auto-location ("PAL") transmission delays in a Bluetooth Low Energy ("BLE") based tire pressure monitoring ("TPM") system. In most countries, it is mandatory for passenger car vehicles to have a tire pressure monitoring system to alert the driver of under inflated tires. The purpose of this is to inform the driver of an unsafe operating mode relating to one, or all of the tires on the vehicle. Each sensor that is installed in the wheels may include a unique identification code associated with it, which enables the pressure values for each wheel to be displayed on the dashboard. If the identification code for each sensor can be associated with a corner of the vehicle, then the vehicle OEM can implement a 'pressure by position' display as described above.

However, a problem may arise if the wheels on the vehicle are swapped. If the vehicle ECU has no way of knowing that this has happened, then the warning given to the driver will be indicating issues with the wrong wheel position. The Assignee of the present disclosure has addressed this particular problem using auto-location system solutions such as wheel unit auto-location ("WAL") and phase auto-location ("PAL"). More information about these systems is available in U.S. Pat. Nos. 8,332,103 and 8,332,104, which are each incorporated by reference in their entirety.

TPM systems such as those in the patents referenced above have traditionally used ultra-high frequency ("UHF") RF systems transmitting in the 315 and 433 MHz ISM bands to transfer the auto-location data from the sensor to the vehicle ECU. OEMs are now beginning to move to Bluetooth based systems to achieve further integration of the TPM, remote keyless entry ("RKE") systems, Passive Entry Passive Start ("PEPS"), and entertainment systems.

BLE is one of the most common short range wireless standards in use today and is available across many products and industries, including computing, mobile, health and fitness and automotive. As the automotive industry moves towards wireless vehicle architectures that use BLE, new methods are required for manufacturing and service processes.

Auto-location systems, such as PAL, may correlate the wheel unit angular information with the vehicle ABS data and the system must have knowledge of the elapsed time from the wheel unit being located at a pre-determined angular position and the vehicle ECU receiving the auto-location data from the wheel unit. Typically, this auto-location data may be included as a time value encoded into the RF frame and may include all system delays up to the point of the RF frame being received at the vehicle ECU.

Figure 3:
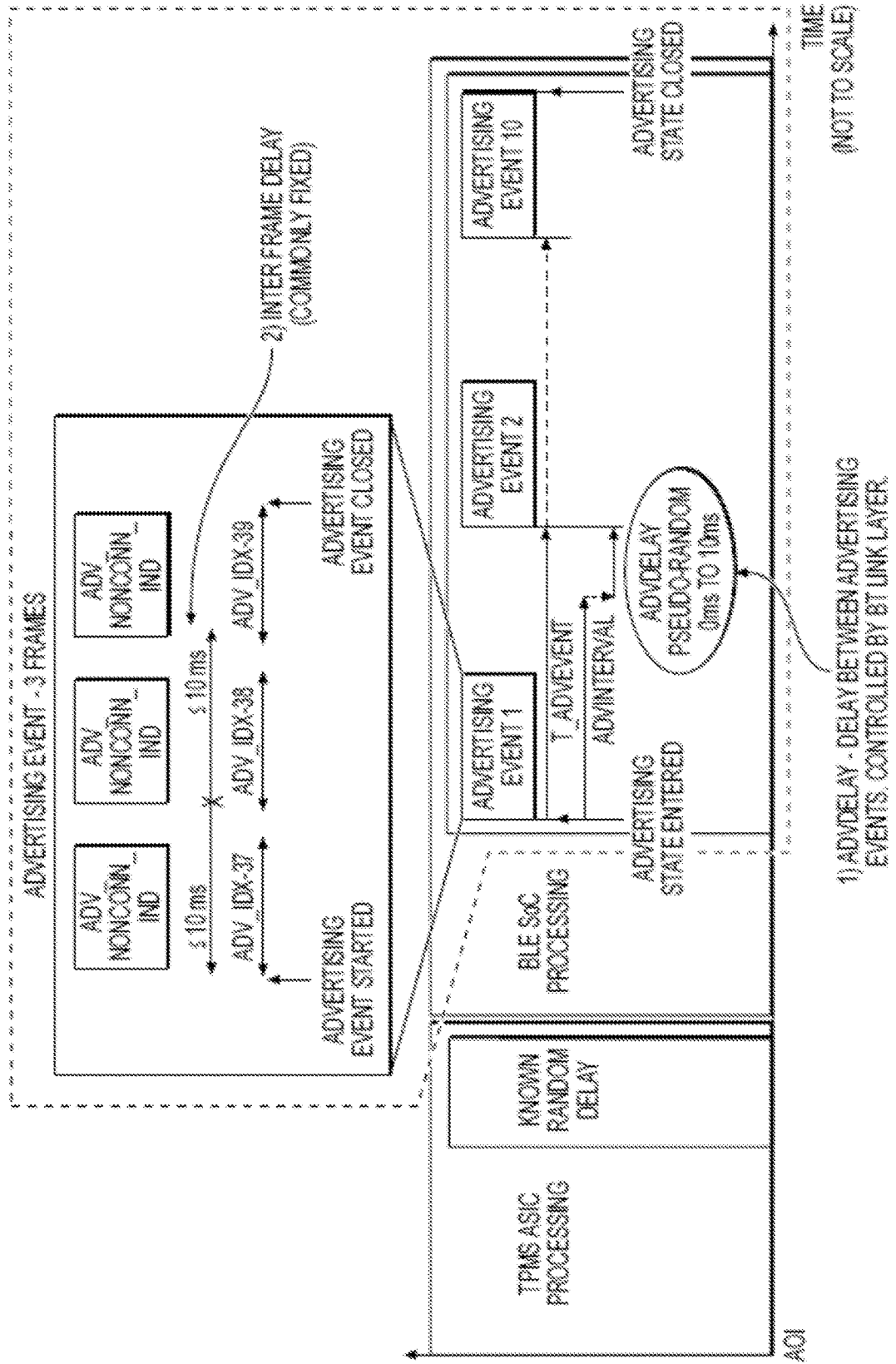
FIG. 3 illustrates a timing diagram highlighting a transmission structure of a non-connectable advertising block consistent with embodiments of the present disclosure.

FIG. 3 shows a timing diagram highlighting a typical transmission structure of a non-connectable advertising block. For example, three problems may arise from changing from a proprietary UHF based wheel unit to a Bluetooth compliant wheel unit. A first problem is that maintaining Bluetooth compliance the delay between Bluetooth events ("T_advEvent") must be randomized and this is typically controlled by the stack component of a BLE transmitter and unknown to the application software at the point of transmission. The inter-event delay (T_advEvent) may include a fixed time ("advInterval") and a variable, randomized delay between 0-10 ms called "advDelay." Without knowledge of the value of advDelay the vehicle ECU may be unable to accurately correlate the PAL information from the sensor with the vehicle ABS data. A second problem is that BLE advertisements are transmitted over three separate channels with a delay between the transmission on each channel. This additional delay may be difficult to compensate because the received channel information is not commonly available from the receiver. A third problem is that if the auto-location data is transferred using a connected mode, lost frames/events may be retried thus adding a delay that may not visible to the application software at the sensor or receiver.

Accordingly, embodiments of the present disclosure include numerous approaches for determining the true time delay between two BLE events within a single block. Embodiments of the present disclosure include a system and method for compensating the transmitted look back time, a critical time measurement used in the Phase Auto-Location ("PAL") system for TPMS, and to account for the randomized inter-event and inter-frame delays that are required for compliance in a Bluetooth Low Energy ("BLE") based system. Embodiments included herein provide details of multiple alternative methods that would enable compensation of the transmitted look back time by the wheel unit or vehicle electronic control unit ("ECU").

In some embodiments, the look back time may be compensated prior to the transmission of events 2→n (where n is the number of events in the transmitted block) by predetermining the random component of each inter-event delay, advDelay, and adding to the time from the Angle Of Interest ("AOI") to the start of transmission of the first frame of the previous event (or first if no previous). A further compensation may then be applied to the reported look back time of frames 2 and 3 of each event to account for the time between transmission of the frames on the 3 Bluetooth advertising channels. Embodiments included herein may provide for compensation of transmission delays when the wheel unit and vehicle ECU are operating in a connected mode. In this mode of operation variability in the transmission time occurs due to the retry mechanism. Embodiments are included to detect and compensate for the additional delay as is discussed in further detail hereinbelow.

Figure 4:
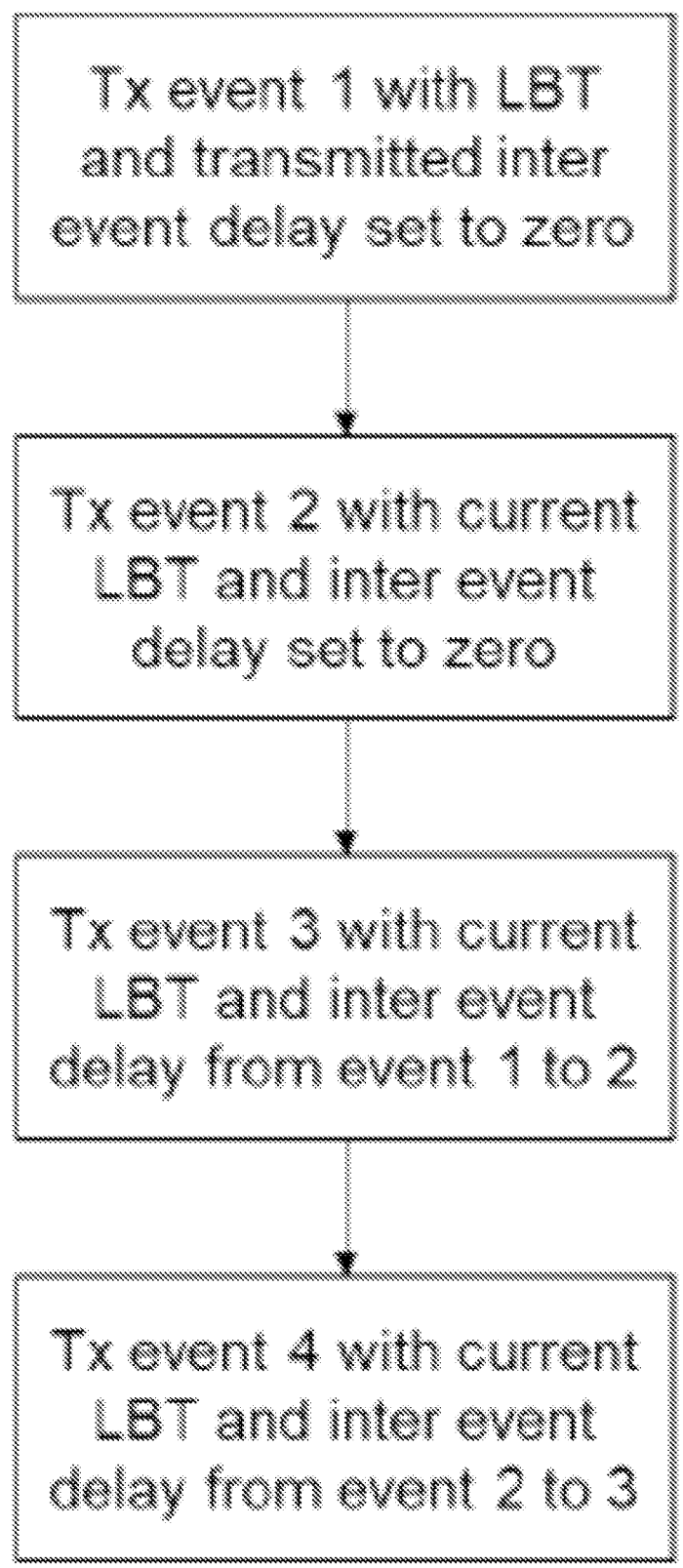
FIG. 4 illustrates a flowchart for reporting inter-event delay in a 4 event block consistent with embodiments of the present disclosure.
Figure 5:
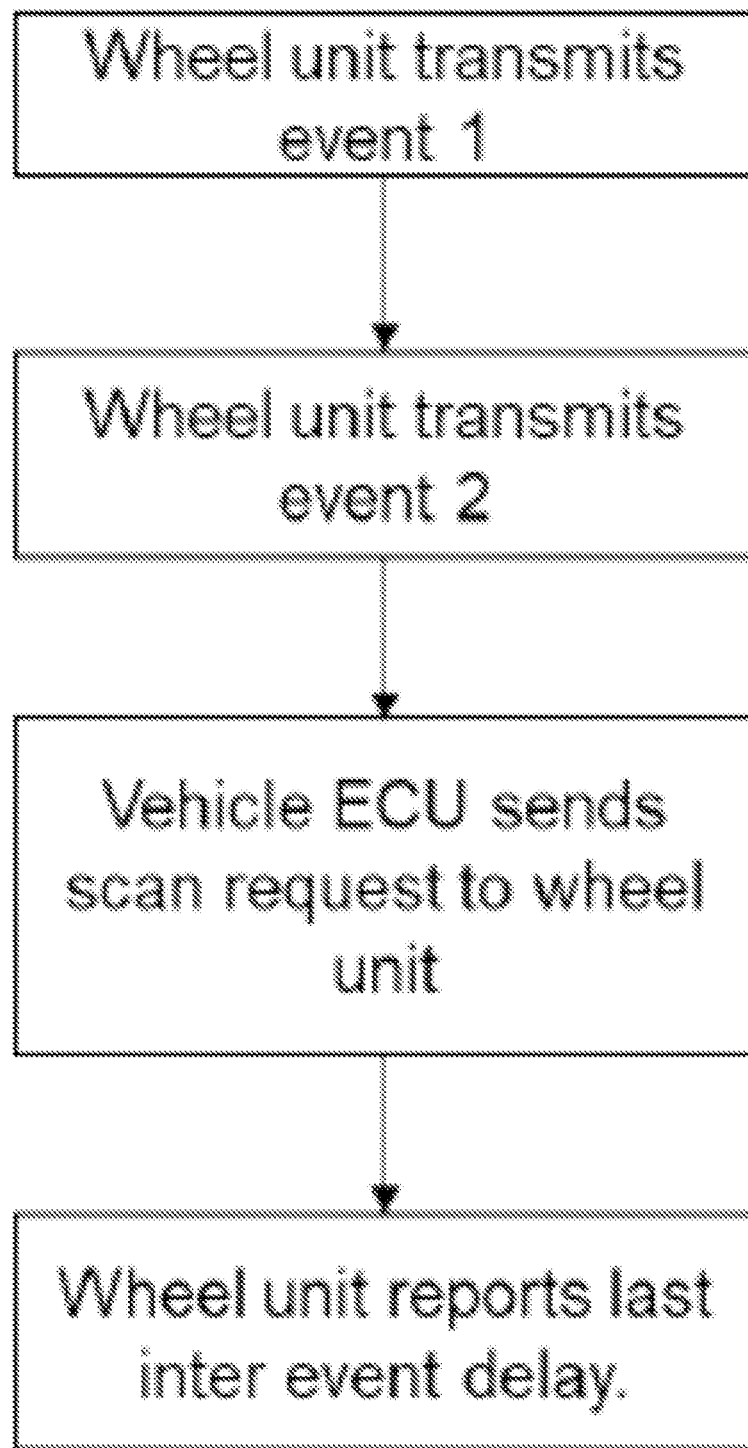
FIG. 5 illustrates a flowchart using a scan response to provide inter-event delay to a vehicle electronic control unit ("ECU") consistent with embodiments of the present disclosure.

Referring now to FIGS. 4-5, an example embodiment (method 1a) directed to problem (1) is provided which shows the reporting of transmission delays in a follow-up Bluetooth event. FIG. 4 depicts an example flowchart which shows reporting an inter-event delay in a four event block consistent with embodiments of the present disclosure. To address problem (1), and without modification of the BLE stack, the inter-event delay may be passed to the vehicle ECU by providing the last inter-event delay in the next transmitted event. The vehicle ECU may then use this information to compensate the received look back time contained within the prior event before performing correlation to the ABS data.

FIG. 5 depicts an example flowchart which shows a process consistent with embodiments of the present disclosure using a scan response to provide an inter-event delay to vehicle ECU. The vehicle ECU may utilize the scan response feature to request the inter-event delay value following successful decoding of an auto-location event. On receiving a PAL event if the event number is >1, the vehicle ECU may be configured to send a scan request on receipt of the event. The wheel unit may provide the inter-event delay in the scan response. This method may still require receipt of consecutive transmissions from the wheel units and also may require the wheel unit to power the Bluetooth radio for a period after each transmitted event to receive the scan request.

In some embodiments, both procedures may require the successful receipt of multiple events from the same transmitted block. This may increase reception rate requirements on the system and potentially require the transmission of additional events, which may have a detrimental effect on battery life/current consumption.

Figure 6:
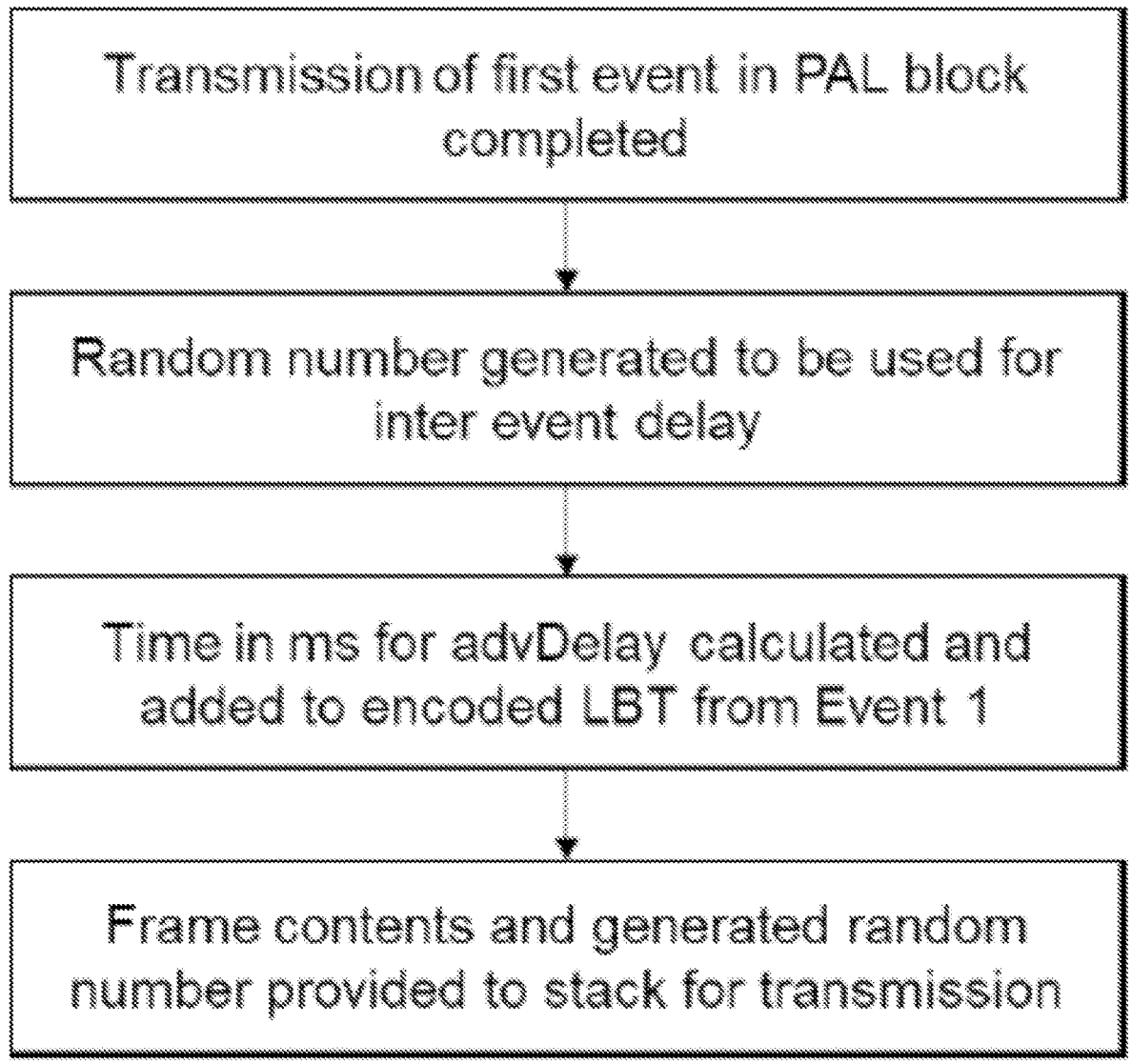
FIG. 6 illustrates a flowchart for utilizing random delay between events consistent with embodiments of the present disclosure.
Figure 7:
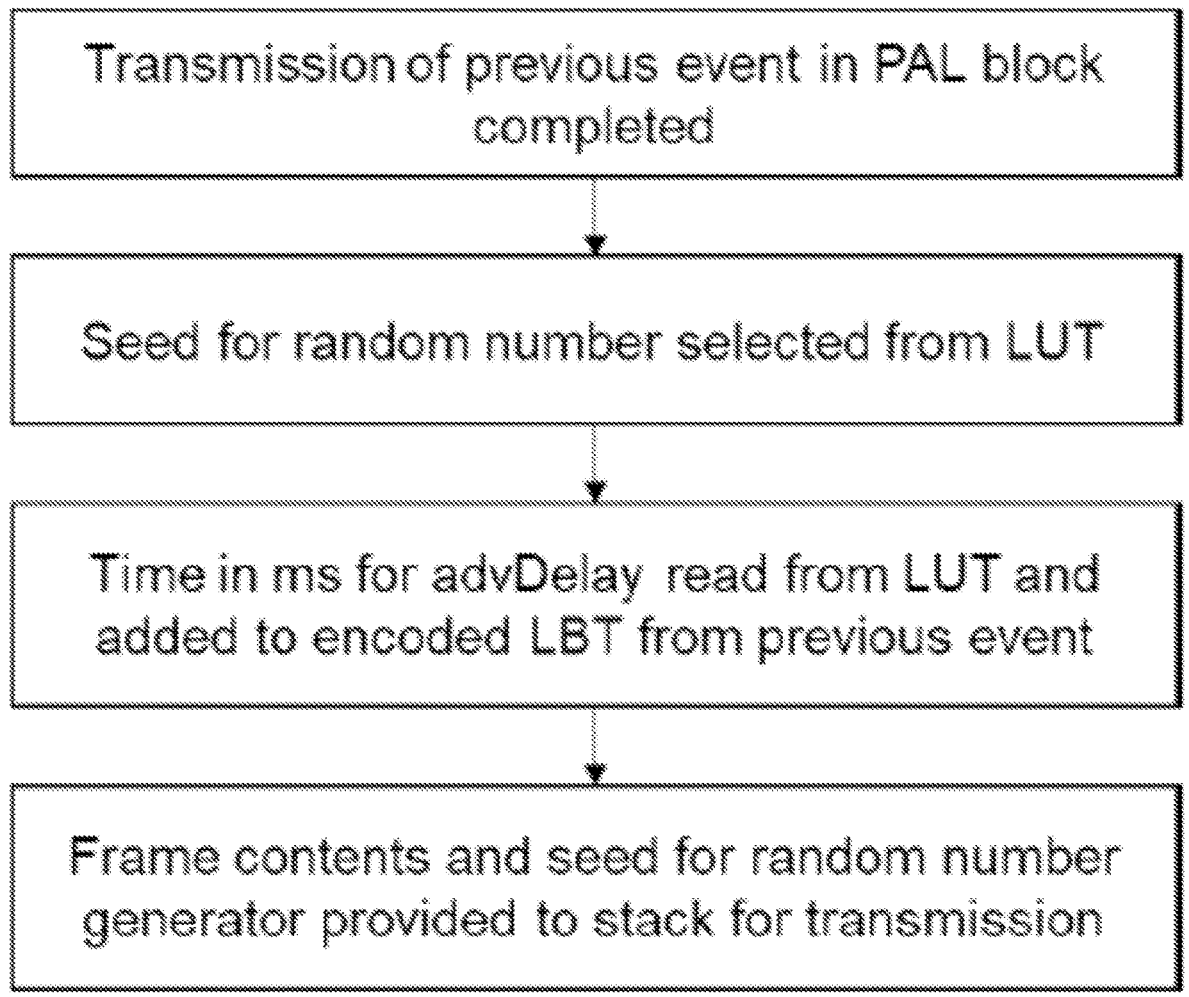
FIG. 7 illustrates a flowchart using seeding method for generating a randomized delay consistent with embodiments of the present disclosure.

Referring also to FIGS. 6-7, an example embodiment (method 1b) directed to problem (1) is provided. Method 1b may provide a random delay to BLE stack. In order to overcome the requirement for the ECU to receive multiple events within a transmitted block an example method is included herein, which may be configured to provide the application software with knowledge of the randomized portion of the inter-event delay prior to the event transmission.

FIG. 6 depicts an example flowchart which shows utilizing random delay between events. In the operation of a Bluetooth stack, the stack software may use a random number generator to provide the delay for the advDelay portion of the inter-event delay T_advEvent, after advertising has been requested to start from the application. In some embodiments, this determination of the random advDelay value may be completed prior to the advertising event being scheduled by the BLE stack and added to the look back time encoded within the transmitted frame. As such, the application software may call the true random number generator function and convert the returned value into a time in milliseconds. The equation to perform this conversion may be determined through knowledge of the stack operation or through characterization. Once the equivalent time in milliseconds has been determined this value may be added to the look back time to be transmitted in the next event. This operation may be performed on the second transmitted event and all subsequent events within the current block.

Embodiments included herein provide numerous advantages over existing approaches. Each event may contain all necessary information to correlate the sensor data to the ABS therefore only one event in the block may be required by the vehicle ECU. The inter-event spacing may remain randomized and compliant with the requirements of the Bluetooth Core specification. Combining the inter-event delay with the Look Back Time ("LBT") may not require any additional fields within the frame contents although adding an additional field for the inter-event delay may be a valid alternative.

FIG. 7 depicts an example flowchart which shows using a seeding method for generating the randomized delay (e.g., "advDelay"). A further variation on the embodiment shown in FIG. 6 may seed the random number generator with a fixed or series of fixed values stored in a look up table ("LUT") or equivalent storage medium. The resulting delay in milliseconds for each of the discrete seed values stored in the look up table may be characterized in advance and be used for look back time compensation.

Figure 8:
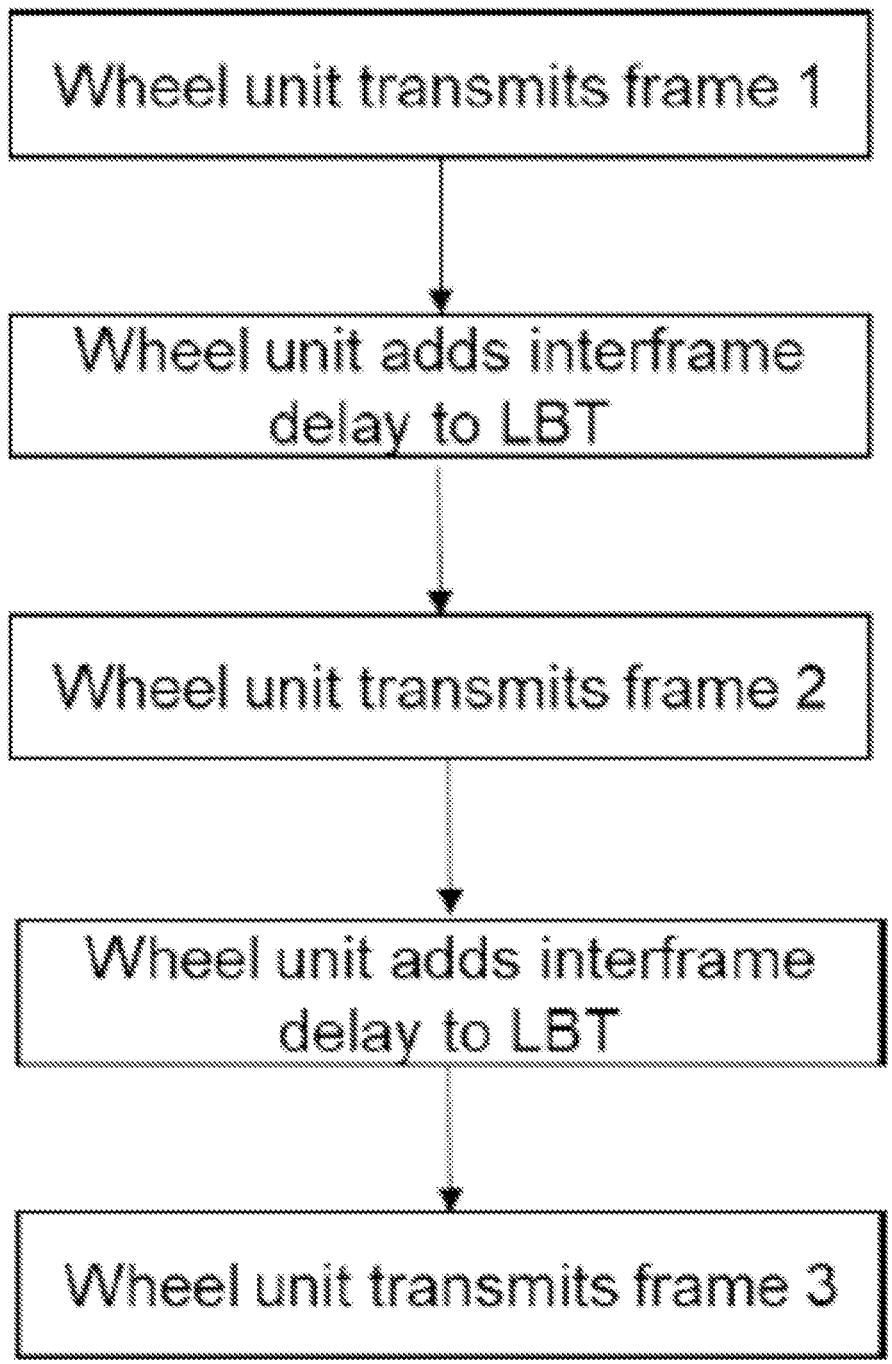
FIG. 8 illustrates a flowchart for modifying a Look Back Time ("LBT") of each frame to account for inter-frame delay consistent with embodiments of the present disclosure.
Figure 9:
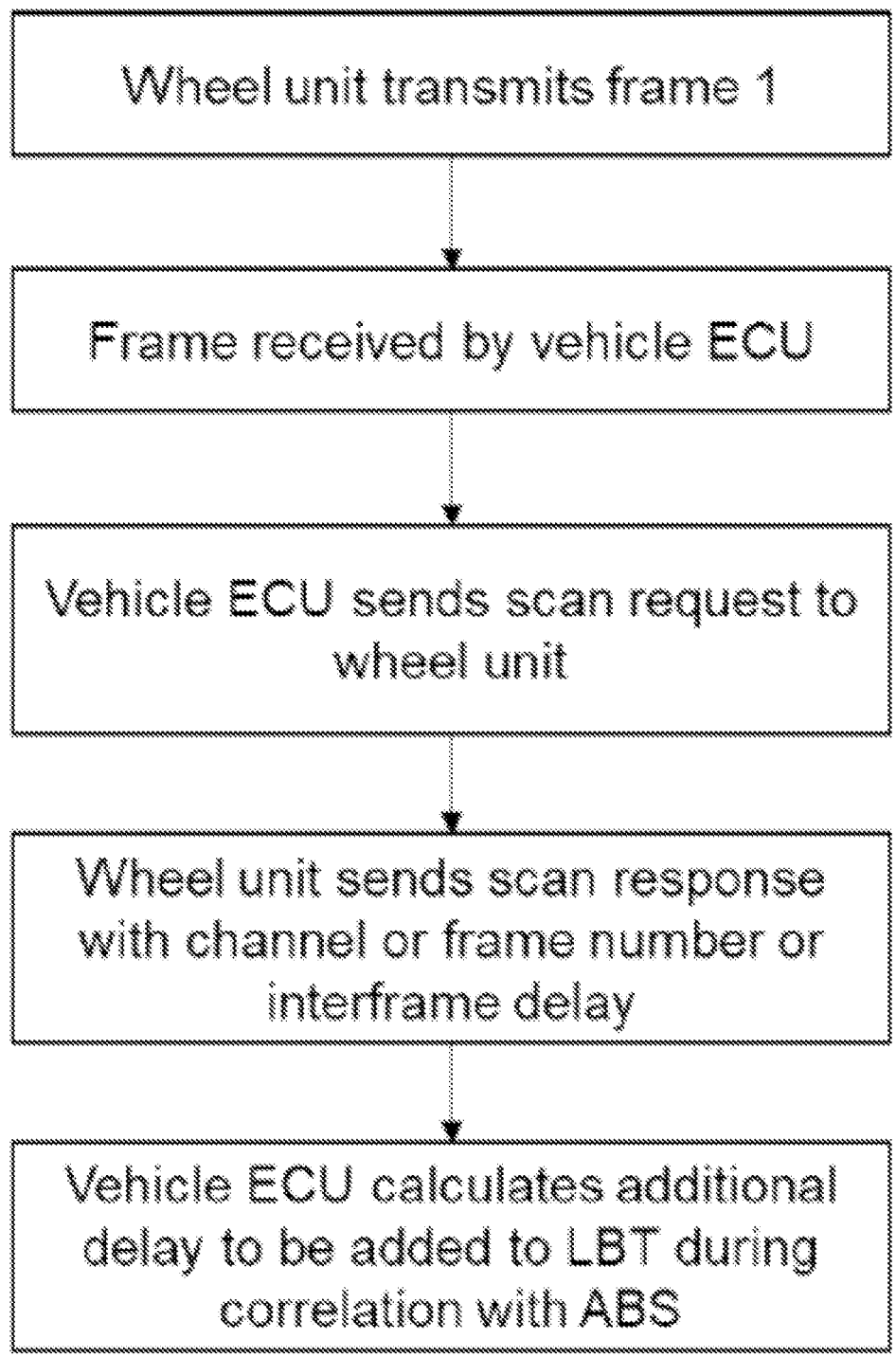
FIG. 9 illustrates a flowchart showing how a scan response may be used to compensate for inter-frame delay consistent with embodiments of the present disclosure.
Figure 10:
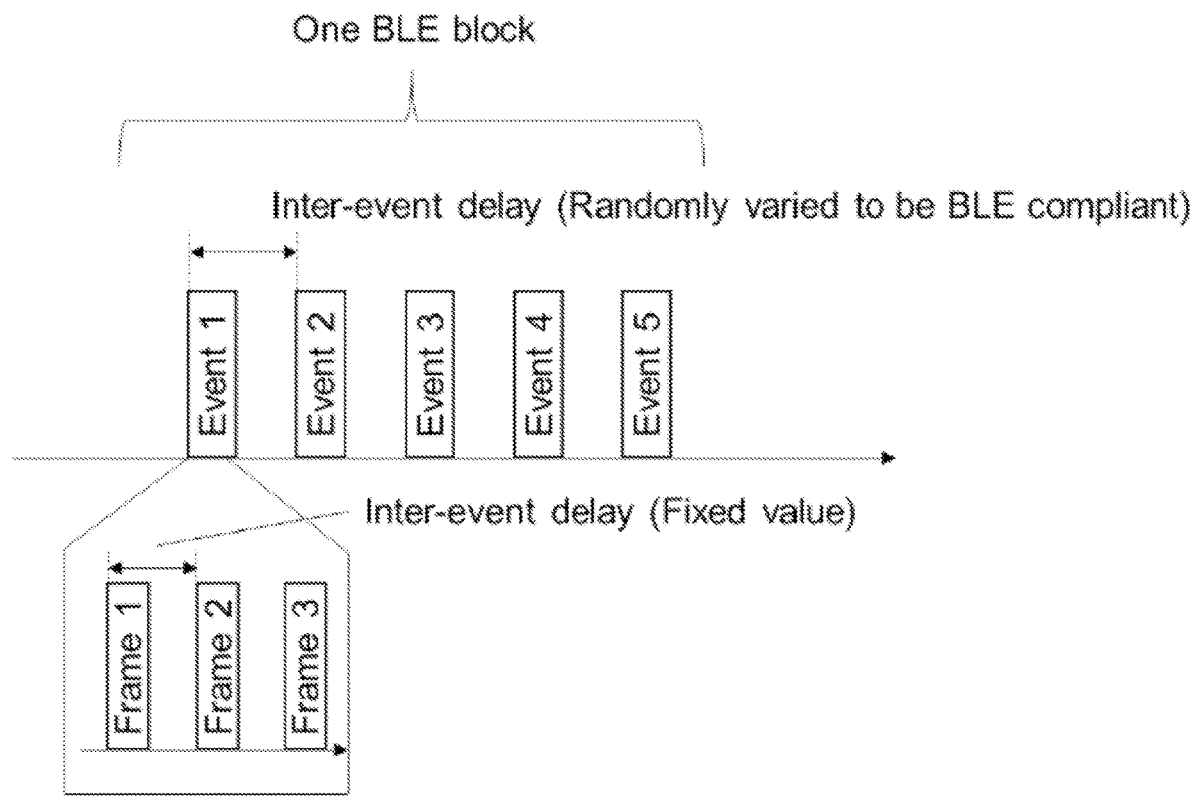
FIG. 10 illustrates a diagram showing inter-event delay consistent with embodiments of the present disclosure.
Figure 11:
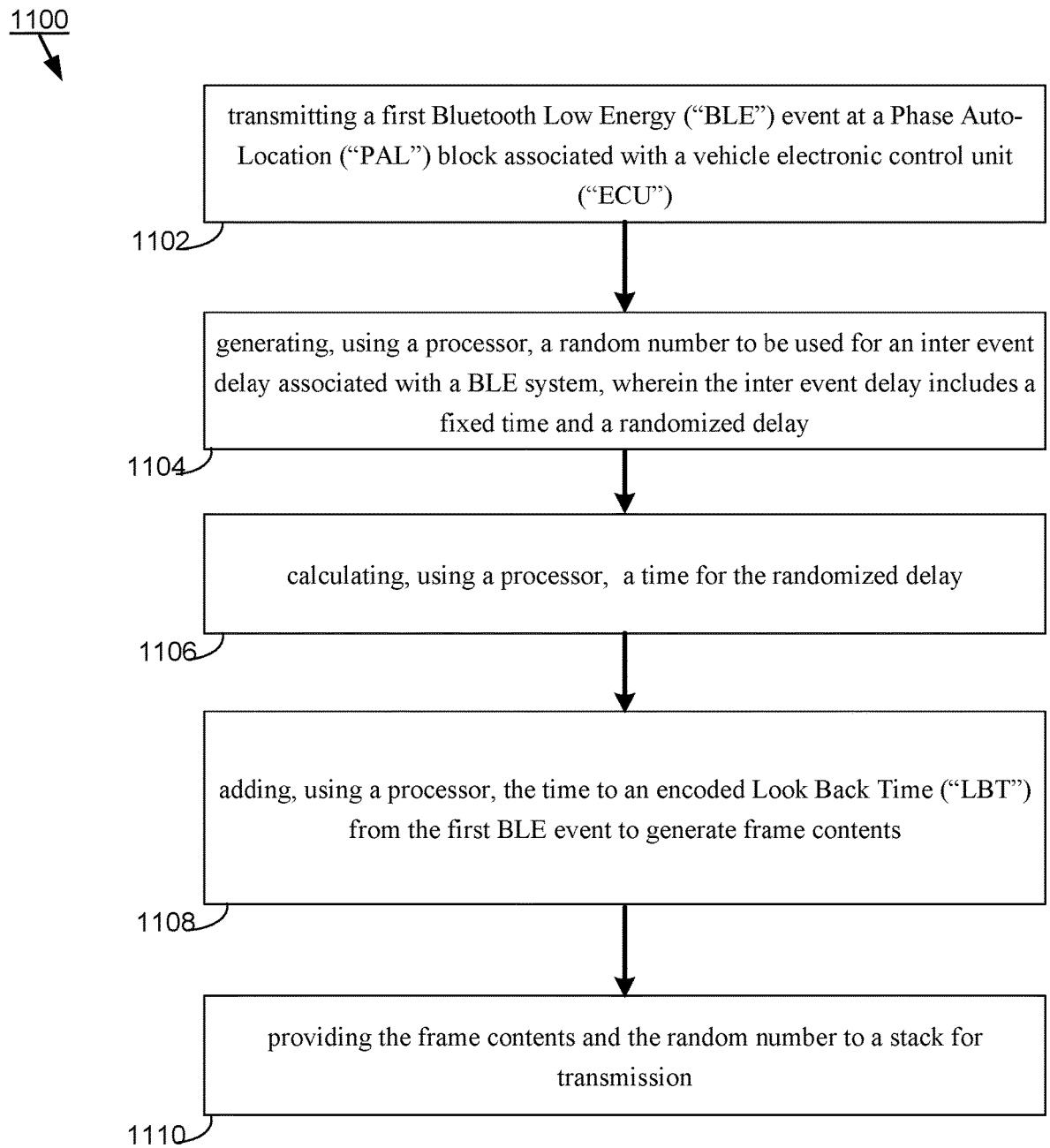
FIG. 11 illustrates a flowchart showing operations consistent with embodiments of the present disclosure.

Referring to FIGS. 8-9, in some embodiments, methods for compensating the inter-frame delays as identified in problem (2) above are provided. An example embodiment (method 2a) may provide information in frame contents to allow the vehicle ECU to compensate. Accordingly, to enable the vehicle ECU to compensate for the fixed inter-frame delays, as shown in FIG. 3, it must have knowledge of the advertising channel the frame was transmitted on and the delay between transmission on each advertising channel. If the receiver is capable of reporting the received channel to the receiver application software, and the value of the inter-frame delay may be known to the receiver software, then the received look back time may simply be adjusted by adding one inter-frame delay to the received look back time for a frame on channel 38 or two for a frame on channel 39. Additionally and/or alternatively, the sensor may report the inter-frame delay within the frame contents to enable the time to be changed without requiring a change to the ECU software.

In some embodiments, processes included herein may include the frame contents containing both the transmitted advertising channel and the inter-frame delay. This has the advantage of not requiring the Bluetooth ECU to have the ability to report the received channel to the application software or have advance knowledge of the inter-frame delay being used.

FIG. 8 depicts an example flowchart which shows modifying LBT of each frame to account for inter-frame delay. In some embodiments, the wheel unit may modify the look back time in each transmitted frame to account for the inter-frame delays experienced. This requires the BLE stack on the wheel unit to allow for modification of frame contents between transmitted frames but removes the requirement for the inter-frame delay to be compensated by the vehicle ECU and for the vehicle ECU to determine the received channel or store the inter-event delay.

FIG. 9 depicts an example flowchart depicting an example of how a scan response could be used to compensate inter frame delay. This particular example may be used to inform the vehicle ECU of the inter-frame delay and to use a scan response from the sensor to transmit a current advertising channel back to the receiver in advertising data. The scan response feature may utilize a short receive window provided by the wheel unit after each transmission to provide the vehicle ECU an opportunity to request additional information from the wheel unit. As discussed above in method 1a, this has the disadvantage of requiring multiple transmissions, from the wheel unit to be received but does at least remove the requirement for the frame contents to be modified between frames and for the ECU to have prior knowledge of the selected inter-frame delay value.

An example embodiment directed to problem (3) is provided which shows compensation of transmission delays using connected mode. While some embodiments may primarily relate to operating the wheel unit in an advertising, or transmit only mode (with the exception of scan response), it is also possible to transfer the auto-location information by the wheel unit and vehicle ECU entering a connected state. Some benefits of using a connected mode are that periodic transmissions are compliant with the Bluetooth specification in this operating mode, so the compensation for the random inter-event delay is not required. Additionally, the vehicle ECU may adjust the time the sensor spends in the higher current auto-location mode to match the needs of the system. For example, if the system completes location within the first few minutes the vehicle ECU can notify the wheel units to stop measuring auto-location data and revert to the lower current drive mode instead of running for the typical nine minutes of today's UHF systems.

Embodiments included herein may be configured to address the handling of transmission delays in a connected mode caused by resending of unacknowledged packets. For example, while in connected mode, the wheel unit may resend events when the vehicle ECU has not acknowledged their receipt. This functionality may be handled in the stack component of Bluetooth devices and may operate automatically. As retried events maintain the same periodic transmission rate by adding a retry count to the transmission contents the vehicle ECU may calculate the additional transmission delay that must be added to the reported look back time from the wheel unit.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A tire pressure monitoring method comprising:
    transmitting a first Bluetooth Low Energy ("BLE") advertising event at a Phase Auto-Location ("PAL") block associated with a vehicle electronic control unit ("ECU");
    generating, using a processor, a random number to be used for an inter-event delay associated with a BLE system, wherein the inter-event delay includes a fixed time and a randomized delay;
    calculating, using a processor, a time for the randomized delay;
    adding, using a processor, the time to an encoded Look Back Time ("LBT") from the first BLE advertising event to generate frame contents;
    providing the frame contents and the random number to a stack for transmission;
    receiving a scan request from the vehicle ECU to provide the inter-event delay; and
    transmitting the inter-event delay in a scan response to the vehicle ECU, wherein the scan response occurs without modifying frame contents between transmitted frames.

2. The method of claim 1, further comprising:
    transmitting at least one of the frame contents and the random number.

3. The method of claim 2, wherein the first BLE advertising event is a single event that is received prior to transmitting.

4. The method of claim 1, wherein generating the randomized delay occurs after advertising has been requested.

5. The method of claim 1, wherein generating the random number includes selecting a seed from a look-up-table.

6. The method of claim 5, wherein calculating a time includes selecting a time from a look-up-table.

7. A tire pressure monitoring system comprising:
    an electronic control unit ("ECU") configured to transmit or receive a first Bluetooth Low Energy ("BLE") advertising event at a Phase Auto-Location ("PAL") block associated with the ECU; and
    a processor configured to generate a random number to be used for an inter-event delay associated with a BLE system, wherein the inter-event delay includes a fixed time and a randomized delay, wherein the processor is further configured to calculate a time for the randomized delay and to add, using a processor, the time to an encoded Look Back Time ("LBT") from the first BLE advertising event to generate frame contents, wherein the processor is further configured to provide the frame contents and the random number to a stack for transmission, wherein the processor is further configured to receive a scan request from the vehicle ECU to provide an inter-event delay, and wherein the processor is further configured to transmit the inter-event delay in a scan response to the vehicle ECU, wherein the scan response occurs without modifying frame contents between transmitted frames.

8. The tire pressure monitoring system of claim 7, wherein the at least one processor is further configured to transmit at least one of the frame contents and the random number.

9. The tire pressure monitoring system of claim 8, wherein the first BLE advertising event is a single event that is received prior to transmitting.

10. The tire pressure monitoring system of claim 7, wherein generating the randomized delay occurs after advertising has been requested.

11. The tire pressure monitoring system of claim 7, wherein generating the random number includes selecting a seed from a look-up-table.

12. The tire pressure monitoring system of claim 11, wherein calculating a time includes selecting a time from a look-up-table.

13. A tire pressure monitoring method comprising:
    transmitting from a wheel sensor, a first frame associated with a first Bluetooth Low Energy advertising event ("BLE");
    adding a first inter-frame delay to a Look Back Time ("LBT") associated with the first BLE advertising event;
    transmitting, from the wheel sensor, a second frame associated with a second BLE advertising event;
    adding a second inter-frame delay to an LBT associated with the second BLE advertising event;
    transmitting, from the wheel sensor, a third frame associated with a third BLE advertising event;
    receiving a scan request from the vehicle ECU to provide an inter-event delay, wherein the inter-event delay includes a fixed time and a randomized delay; and
    transmitting the inter-event delay in a scan response to the vehicle ECU, wherein the scan response occurs without modifying frame contents between transmitted frames.

14. The method of claim 13, wherein the wheel sensor includes a BLE stack configured to allow modification of frame contents.

15. The method of claim 13, further comprising:
    transmitting data to the ECU without requiring the inter-frame delay compensation by the vehicle ECU.

16. The method of claim 13, further comprising:
    transmitting data to the ECU without requiring that the vehicle ECU determine a received channel.

17. The method of claim 13, further comprising:
    transmitting data to the ECU without requiring that the vehicle ECU store the inter-event delay.

* * * * *